(12) United States Patent
Miyauchi

(10) Patent No.: US 7,396,422 B2
(45) Date of Patent: Jul. 8, 2008

(54) ROLLING BEARING, MATERIAL FOR ROLLING BEARING, AND EQUIPMENT HAVING ROTATING PART USING THE ROLLING BEARING

(75) Inventor: Toshiaki Miyauchi, Hyogo (JP)

(73) Assignee: Kent Engineering, Hyogo (JP)

( * ) Notice: Subject to any disclaimer, the term of this patent is extended or adjusted under 35 U.S.C. 154(b) by 368 days.

(21) Appl. No.: 10/531,518
(22) PCT Filed: Oct. 24, 2003
(86) PCT No.: PCT/JP03/13590

§ 371 (c)(1),
(2), (4) Date: Apr. 15, 2005

(87) PCT Pub. No.: WO2004/042245

PCT Pub. Date: May 21, 2004

(65) Prior Publication Data

US 2006/0011269 A1    Jan. 19, 2006

(30) Foreign Application Priority Data

Nov. 5, 2002    (JP) .............................. 2002-320923

(51) Int. Cl.
*C22C 38/22*    (2006.01)
*C22C 38/20*    (2006.01)

(52) U.S. Cl. ...................... 148/334; 148/332; 148/325; 148/326; 148/328; 148/908; 384/912

(58) Field of Classification Search ......... 148/325–326, 148/334, 328, 578, 908, 906, 332, 663; 420/61, 420/105, 90, 93, 111; 384/625, 912

See application file for complete search history.

(56) References Cited

U.S. PATENT DOCUMENTS 4,886,640 A * 12/1989 Garner et al. ............... 420/111

(Continued)

FOREIGN PATENT DOCUMENTS

DE    3922720 A1    1/1990

(Continued)

OTHER PUBLICATIONS

International Search Report for International Application No. PCT/JP03/13590 dated Jan. 27, 2004 from the Japanese Patent Office.

*Primary Examiner*—Deborah Yee
(74) *Attorney, Agent, or Firm*—Marshall, Gerstein & Borun LLP

(57) ABSTRACT

The invention relates to a rolling bearing which provides superior noiselessness and high corrosion resistance and longer life, and is manufactured at a low cost, a material for the rolling bearing, and an instrument including a rotating portion using the rolling bearing. A plurality of rolling elements are provided between an inner ring and an outer ring. At least one of the inner and outer rings and is formed of corrosion resistant bearing steel comprising a specific chemical component. The corrosion resistant bearing steel comprises eutectic carbides having an average value of circle equivalent diameter of 0.2 to 1.6 μm, an average area of 0.03 to 2 μm$^2$, and an area ratio of 2 to 7%. The hardness of the corrision resistant bearing steel is HRC 58 to 62 by JIS. The amount of retained austenite in the corrosion resistant bearing steel is 6 volume % or less.

22 Claims, 6 Drawing Sheets

U.S. PATENT DOCUMENTS

| | | | |
|---|---|---|---|
| 4,902,473 A * | 2/1990 | Arata et al. | 420/105 |
| 5,013,525 A * | 5/1991 | Hamada et al. | 420/104 |
| 5,998,042 A * | 12/1999 | Tanaka et al. | 428/627 |
| 6,086,686 A * | 7/2000 | Tanaka et al. | 148/325 |
| 6,143,425 A * | 11/2000 | Tanaka et al. | 428/627 |
| 6,228,184 B1 * | 5/2001 | Tanaka et al. | 148/325 |
| 6,409,846 B1 * | 6/2002 | Takemura et al. | 148/325 |
| 6,592,684 B1 * | 7/2003 | Yamamura et al. | 148/325 |

FOREIGN PATENT DOCUMENTS

| | | |
|---|---|---|
| GB | 2328479 A | 2/1999 |
| JP | 05-002734 | 1/1993 |
| JP | 06-117439 | 4/1994 |
| JP | 06-240407 | 8/1994 |
| JP | 2000-144258 | 5/2000 |

* cited by examiner

ROLLING BEARING, MATERIAL FOR ROLLING BEARING, AND EQUIPMENT HAVING ROTATING PART USING THE ROLLING BEARING

TECHNICAL FIELD

The present invention relates to a rolling bearing, a material for the rolling bearing, and an instrument having a rotating portion using the rolling bearing. More particularly, the present invention relates to a rolling bearing suitable for use in a rotating portion of a precision instrument such as videotape recorder, or a computer peripheral device, a material for the rolling bearing, and the instrument having the rotating portion using the rolling bearing.

BACKGROUND ART

Conventionally used bearing steels are described below.

Rolling bearings such as ball bearings and roller bearings, which have a contact surface strength in a range of 1000 to 1300 MPa or in a range of 3000 to 4000 Mpa, are formed of high-carbon chromium bearing steel having a high content of carbon or case-hardened steel having a carburized surface. The high-carbon chromium bearing steel contains main components of 1.1% by weight of carbon and 1 to 1.5% by weight of chromium and varies its quenching characteristic according to the content of manganese and molybdenum. This type of steel is quenched at a temperature of 1050 to 1120K, and then tempered at a temperature of 420 to 470K to produce a texture with 7 to 8% by weight of spherical cementites dispersed in martensite. Since the hardness of the tempered steel is as high as HRC 58 to 64 by Japanese Industrial Standard (hereinafter referred to as JIS), clean steel having less flaws and less non-metal inclusions is desirable. At present, the high-carbon chromium bearing steel is typically manufactured utilizing deoxidization by carbon under vacuum degassing process. Further, special melting processes such as electroslag remelting or vacuum arc remelting are combined to reduce non-metal inclusions and to provide fine texture.

The carburized bearing is manufactured by carburizing case-hardened steel, and therefore, has high surface hardness and flexible core portion. The carburized bearing is especially suitable for use as a bearing which is subjected to an impact load.

In case of bearings used under a temperature which is above 390K, the texture of steel tempered at a low temperature is subject to variation, thereby resulting in softening or variation in dimension, and thus, the steel becomes unusable. For this reason, high-carbon high-alloy steels which are tempered at high temperatures, such as M50 (0.8 wt % C—4 wt % Cr—4.3 wt % Mo—1 wt % V) or T1 (0.7 wt % C—4 wt % Cr—18 wt % W—1 wt % V) are used.

However, the conventional bearing steels suffer from drawbacks as described below.

The case-hardened steel is difficult to reduce oxygen content in terms of melting and refining in contrast to the high-carbon chromium bearing steel and tends to generate oxide-based non-metal inclusions, which may reduce rolling contact life.

In addition, the high-carbon high-alloy steel tends to generate large-sized carbides, which may also reduce rolling contact life of the bearing.

On the other hand, the high-carbon chromium bearing steel does not have such drawbacks and can obtain high processing precision. Therefore, the high-carbon chromium bearing steel is suitable for use as the rotating portion of the precision instrument which particularly requires noiselessness during rotation. However, the high-carbon chromium bearing steel tends to rust and needs to be coated with rust-proof oil on an outer surface thereof. The rust-proof oil may be gasified and cause a malfunction of the precision instrument.

Accordingly, martensite based stainless steel corresponding to SUS440C steel by JIS with high corrosion resistance and high wear resistance is used for the bearings used in corrosive atmosphere. However, this stainless steel contains eutectic carbides resulting from an eutectic reaction when molten steel is solidified or non-metal inclusions such as alumina resulting from a chemical reaction of impurities of a material in the molten steel. When this stainless steel product is cut, high-precision cutting action cannot be achieved due to a difference in cutting state (machinability) of texture between the eutectic carbides or the non-metal inclusions and the stainless steel product. In particular, since rolling contact grooves formed on inner and outer rings cannot be processed with high precision, the rolling bearing vibrates and generates a high level of noise during rotation. Therefore, this stainless steel product cannot be used for the rotating portion of the precision instrument.

Accordingly, there has been proposed a rolling bearing which can improve noiselessness, and provides high wear resistance and high corrosion resistance (for example, see Japanese Unexamined Laid-Open Patent Publication No. Hei 6-117439 and Japanese Patent Publication No. Hei 5-2734.

The Publication No. Hei 6-117439 discloses a ball bearing comprising a plurality of balls made of high-carbon chromium bearing steel interposed between inner and outer rings, at least one of the inner and outer rings being formed of martensite based stainless steel having hardness of HRC 58 or higher by JIS and comprising eutectic carbides having a diameter of 10 μm or less.

The Publication No. Hei 5-2734 discloses a rolling bearing formed of stainless steel comprising a plurality of rolling elements interposed between inner and outer rings, the stainless steel comprising carbon of 0.6 to 0.75 wt %, silicon of 0.1 to 0.8 wt %, manganese of 0.3 to 0.8 wt %, chromium of 10.5 to 13.5 wt %, iron as remaining component, and impurities inevitably incorporated thereinto, and containing eutectic carbide with a long diameter of 20 μm or less and an area ratio of 10% or less.

When large-sized eutectic carbides appear on the surface of the bearing, a proper finished surface is difficult to form, due to the difference in cutting state between these carbides and a matrix around the carbides, and a noise may be generated during rotation, as described above. In addition, since the large-sized eutectic carbides generate a difference in wear resistance between the carbides and the matrix around the carbides during use of the bearing, they drop from a cracked surface, which causes a deformation of the surface shape of the bearing and significantly degrades noiselessness. It is therefore desirable to minimize the size of the carbides, because they are less likely to appear on the surface of the bearing. So, reducing the diameter of the carbide to 20 μm or less or 10 μm or less as disclosed in the above publications is effective in lowering the level of noise. Nonetheless, a satisfactory noiselessness cannot be obtained merely by reducing the size of the carbides. In addition, additional processes in manufacturing technique are required to thus reduce the size of the carbides. This greatly increases a manufacturing cost and is therefore unpractical.

The present invention has been developed in view of the above described problems accompanied by the prior arts, and an object thereof is to provide a rolling bearing which can improve noiselessness, and provide high corrosion resistance and longer life (corresponding to high wear resistance) and can be manufactured at a low cost, a material for the rolling bearing, and an instrument including a rotating portion using the rolling bearing.

DISCLOSURE OF THE INVENTION

The present invention has been made as follows: attention has been focused on an average value of circle equivalent diameters of chemical components in a steel, specifically, eutectic carbides contained in corrosion resistant bearing steel, an average area of the eutectic carbides, an area ratio of the eutectic carbides, hardness of the corrosion resistant bearing steel, the amount of retained austenite in the corrosion resistant bearing steel, and an average crystal grain size of the corrosion resistant bearing steel, and the relationship between these numeric values and cutting state (machinability, processability), noiselessness of an instrument including the rolling bearing or a rotating portion, life of the rolling bearing, a manufacturing cost of the rolling bearing, etc, have been intensively studied.

Specifically, by relatively reducing the contents of carbon and chromium for improving the life or corrosion resistance, it is possible to inhibit generation of the eutectic carbides. And, in order to resolve the problem caused by reducing the content of carbon and chromium, copper and molybdenum are added in relatively large amount.

It is clear that the noiselessness of the rolling bearing is effectively improved by reducing a maximum diameter of the eutectic carbides. Actually, however, it is difficult to reduce the maximum diameter of the eutectic carbides with a general manufacturing technique for mass production, and additional processes are necessary, which significantly increases a manufacturing cost. Considering the manufacturing cost, it would be preferable that the average value of the circle equivalent diameters of the eutectic carbides, the average area of the eutectic carbides, and the area ratio of the eutectic carbides are set within predetermined ranges, because machinability is substantially improved and the manufacturing cost is not increased.

Typically, the average value of the circle equivalent diameters of the eutectic carbides is approximately 2.0 to 2.8 μm. Reducing the average value of the circle equivalent diameters is effective in improving the machinability, and it would be preferable that the average value of the circle equivalent diameters of the eutectic carbides is 0.2 to 1.6 μm. In this application, the average value of the circle equivalent diameters of the eutectic carbides means an average value of diameters of circles into which areas of the respective eutectic carbides obtained by an image analysis device have been converted.

The average area of the eutectic carbides is typically approximately 3.0 to 6.0 μm$^2$. Reducing the average area is effective in improving machinability, and hence it would be preferable that the average area of the eutectic carbides is 0.03 to 2.0 μm$^2$.

It would be preferable that an absolute content of the eutectic carbides is limited to improve the machinabiliy. Therefore, it would be preferable that the area ratio of the eutectic carbides is 2 to 7%. In this application, the area ratio of the eutectic carbides means a ratio (percentage) of a total area of the eutectic carbides to a total area measured within a field of view.

It would be preferable that the hardness of the corrosion resistant bearing steel is 58 to 62 in Rockwell hardness C scale (HRC) by JIS in order to ensure longer rolling contact life, wear resistance and toughness of a raceway surface or a rolling contact surface.

It would be preferable that the content of retained austenite is 6 volume % or less, because it is necessary to reduce the content of retained austenite to inhibit unwanted permanent deformation of the raceway surface or the rolling contact surface which may be caused by a load or an impact. By reducing the content of retained austenite, indentation resistance of the raceway surface or the rolling contact surface is improved and time-lapse degradation of a surface smoothness of the raceway surface or the rolling contact surface can be prevented.

Further, it would be preferable that an average crystal grain size is within a range of 6 to 9. 5 μm in order to stabilize processability and hardness.

A first invention of the present application provides a rolling bearing comprising a plurality of rolling elements provided between inner and outer rings, at least one of the inner and outer rings being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%, the corrosion resistant bearing steel having a hardness of HRC 58 to 62 by JIS, and containing a retained austenite of 6 volume % or less.

A second invention of the present application provides a rolling bearing comprising a plurality of rolling elements provided between inner and outer rings, the inner and outer rings, and the rolling elements being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, an average area of 0.03 to 2 μm$^2$ and an area ratio of 2 to 7%, the corrosion resistant bearing steel having a hardness of HRC 58 to 62 by JIS, and containing a retained austenite of 6 volume % or less.

A third invention of the present application provides a rolling bearing comprising a plurality of rolling elements provided between a rolling contact groove formed on an outer periphery of a shaft and a rolling contact groove formed on an inner periphery of an outer ring, at least one of the shaft and the outer ring being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.70 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%, the corrosion resistant bearing steel having a hardness of HRC 58 to 62 by JIS, and containing a retained austenite of 6 volume % or less.

A fourth invention of the present application provides a rolling bearing in which, in the first, second or third invention, an average crystal grain size of the corrosion resistant bearing steel is 6 to 9.5 μm.

A fifth invention of the present application provides a material for the rolling bearing, which is corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%.

A sixth invention provides an instrument having a rotating portion using the rolling bearing of the first or fourth invention.

A seventh invention provides an instrument having a rotating portion using the rolling bearing of the second or fourth invention.

An eighth invention provides an instrument having a rotating portion using the rolling bearing of the third or fourth invention.

A ninth invention is characterized in that the instrument having the rotating portion defined in any one of the sixth to eighth inventions is a hard disk drive.

A tenth invention is characterized in that the instrument having the rotating portion defined in any one of the sixth to eighth inventions is a precision instrument.

In this application, "noiselessness" means that "level of a noise attributable to metal material in noises generated during an operation of a precision instrument such as a hard disk drive into which a rolling bearing comprising a rolling element, an inner ring or an outer ring formed by processing a metal material is incorporated is low." The noise is caused by vibration generated during rotation of the rolling bearing, and the vibration depends largely on a shape precision of the rolling elements, the inner ring and the outer ring as described previously. In a relatively small-sized rolling bearing used in the area of precision instruments such as the hard disk drives, the noiselessness which is negligible in other uses becomes significant.

Accordingly, at least one of the inner and outer rings of the rolling bearing comprising the plurality of rolling elements provided between the inner and outer rings may be formed of the corrosion resistant bearing steel of the present invention, or at least one of the shaft and the outer ring of the rolling bearing comprising the plurality of rolling elements provided between the shaft provided with the rolling contact groove on the outer periphery and the outer ring may be formed of the corrosion resistant bearing steel of the present invention. Thereby, the rolling bearing of the present invention is less likely to rust than that formed of the high-carbon chromium bearing steel. As a result, corrosion resistance and life of the bearing increase.

The corrosion resistant bearing steel may comprise carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.70 wt %, titanium of 15 ppm or less, vanadium of 0.15 wt % or less, oxygen of 15 ppm or less, iron as remaining component and impurities inevitably incorporated thereinto, and a portion occupied by the eutectic carbides, i.e., area of the eutectic carbides may be set within a predetermined range. Thereby, machinability can be improved without a substantial increase in manufacturing cost.

The average value of the circle equivalent diameters of the eutectic carbides may be set to 1.6 μm or less, the average area of the eutectic carbides may be set to 2 μm$^2$ or less, and the area ratio of the eutectic carbides may be set to 7% or less. Thereby, the machinability can be further improved, and the noiselessness can be significantly improved.

However, special manufacturing processes become necessary to significantly reduce the average value of the circle equivalent diameters of the eutectic carbides, and the average area and the area ratio of the eutectic carbides. This significantly increases a manufacturing cost. If the average value of the circle equivalent diameters of the eutectic carbides is 0.2 μm or more, the average area of the eutectic carbides is 0.03 μm$^2$ or more, and the area ratio of the eutectic carbides is 2% or more, then the corrosion resistant bearing steel can be manufactured substantially according to a normal manufacturing processes. Therefore, economical manufacturing system can be achieved without substantial increase in the manufacturing cost.

Further, if the inner and outer rings and the rolling elements are formed of the corrosion resistant bearing steel of the present invention, then strain caused by a difference in thermal expansion coefficient will not occur during use under high-temperature condition, because the inner and outer rings and the rolling elements are formed of the same material. So, even under high-temperature condition, noiselessness and longer life can be achieved.

The hardness of the corrosion resistant bearing steel may be HRC 58 to 62 by JIS. Thereby, longer rolling contact life, wear resistance and toughness of the raceway surface or the rolling contact surface can be achieved.

The content of retained austenite in the corrosion resistant bearing steel may be 6 volume % or less. Thereby, indentation resistance can be improved, and time-lapse degradation of the surface smoothness of the raceway surface or the rolling contact surface can be prevented.

The average crystal grain size may be 6 to 9.5 μm. Thereby, the machinability, the noiselessness, the life, etc., of the corrosion resistant bearing steel can be improved.

When at least one of the inner and outer rings and rolling elements of the rolling bearing is formed of the corrosion resistant bearing steel of the present invention, the above effects can be obtained. For example, only the rolling elements may be formed of the corrosion resistant bearing steel of the present invention as the embodiment of the material for the rolling bearing of claim 5, and the inner and outer rings may be formed of stainless steel having the conventional composition shown in table 3.

The content of component (weight %) of the corrosion resistant bearing steel of the present invention is limited for the reason below.

Carbon is an essential element to provide high temperature strength and wear resistance. While the stainless steel disclosed in the publication No. Hei 5-2734 contains carbon of 0.6 to 0.75 wt %, the content of carbon is 0.5 to 0.56 wt % to inhibit generation of carbides in the present invention. The content of carbon which is 0.5 wt % or more is necessary to ensure predetermined high temperature strength and wear resistance, but it would be preferable that the content of carbon is 0.56 wt % or lower because large eutectic carbides are generated, machinability degrades, and corrosion resistance reduces if the content is too high.

The contents of the following elements are set to predetermined values or less as follows: Silicon is 1 wt % or less, Manganese is 1 wt % or less, Phosphorus is 0.03 wt % or less, Sulfur is 0.01 wt % or less, Vanadium is 0.15 wt % or less, Titanium is 15 ppm or less, and Oxygen is 15 ppm or less. These elements are set to these predetermined values or less to inhibit generation of non-metal inclusions without degrading machinability, because, if the contents of these elements are too high, work hardening increases and hence the machinability degrades. In addition, if the contents of these elements are too high, quenching characteristic disadvantageously degrades and the ratio of martensite decreases.

The content of chromium, copper and molybdenum are limited to the predetermined values for the reason below.

Chromium is bonded to C to form a carbide. Chromium increases wear resistance and corrosion resistance when homogeneously mixed in the matrix (formation of solid solution). In the present invention, since carbon is slightly reduced in contrast to the prior arts to inhibit generation of the carbides, chromium is correspondingly reduced to 8.00 to 9.50 wt % as compared to the content (10.5 to 13.5 wt %) disclosed in the publication No. Hei 5-2734. In order to resolve the problem which is caused by reduction of the contents of carbon and chromium, copper and molybdenum are added in relatively larger amount.

In brief, copper increases corrosion resistance and wear resistance. But, if copper is added too much, the steel is less likely to be cracked. Therefore, it would be preferable that the content of copper is 0.30 to 0.70 wt %.

Molybdenum increases quenching characteristic, prevents crystal grain from becoming coarse, and improves corrosion resistance. If molybdenum is less than 0.15 wt %, these effects cannot be substantially obtained, while molybdenum is more than 0.50 wt %, the steel containing much molybdenum cannot be quenched under known quenching conditions. Furthermore, since molybdenum is very expensive metal, cost increase if Mo is added in large amount.

The present invention is constituted as described above and provides a rolling bearing with improved noiselessness, high corrosion resistance, and longer life, which can be manufactured at a low cost, a material for the rolling bearing, and an instrument including a rotating portion using the rolling bearing. Especially, the present invention contributes to cost reduction and improvement of noiselessness of a bearing for videotape recorder, a computer peripheral device, etc., in particular, swing arm, thus offering remarkable industrial effects.

BEST MODE FOR CARRYING OUT THE INVENTION

The embodiments of the present invention will be described with reference to the drawings, but it should be appreciated that the present invention is not intended to be limited to the embodiments described below.

Figure 1:
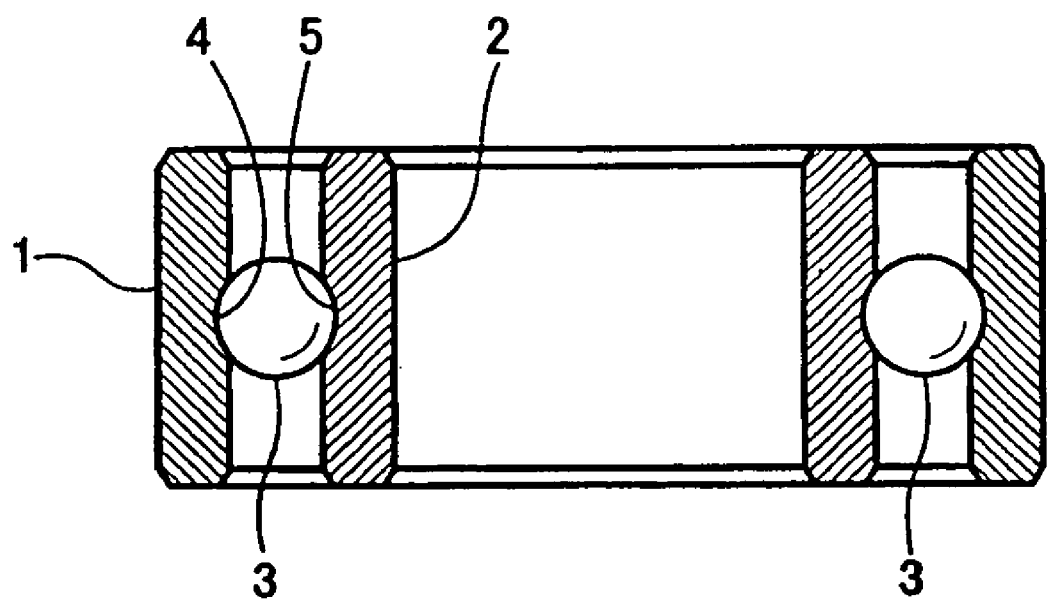
FIG. 1 is a longitudinal sectional view of an embodiment of a rolling bearing of the present invention.

Referring to FIG. 1, 1 denotes an outer ring, 2 denotes an inner ring, and 3 denotes a rolling element. A plurality of rolling elements 3 are loaded between a rolling contact groove 4 formed on an inner periphery of the outer ring 1 and a rolling contact groove 5 formed on an outer periphery of the inner ring 2.

A rolling bearing of example 1 of the present invention is as follows:

The outer ring 1 and the inner ring 2 are formed of corrosion resistant bearing steel of the present invention having a composition (weight %) shown in table 1 below, the rolling element 3 is formed of high-carbon chromium bearing steel (SUJ2 by JIS), and an average crystal grain size of the corrosion resistant bearing steel is limited within a range of the present invention.

A rolling bearing of example 2 of the present invention is as follows:

Only the outer ring 1 is formed of the corrosion resistant bearing steel having the composition shown in table 1, the inner ring 2 and the rolling element 3 are formed of the high-carbon chromium bearing steel (SUJ2 by JIS), and the average crystal grain size of the corrosion resistant bearing steel is limited within the range of the present invention.

A rolling bearing of example 3 of the present invention is as follows:

The outer ring 1, the inner ring 2, and the rolling element 3 are formed of the corrosion resistant bearing steel having the composition shown in table 1.

As shown below, table 4 lists an area ratio of the eutectic carbides contained in the corrosion resistant bearing steel, a maximum diameter of the eutectic carbides, an average value of circle equivalent diameters of the eutectic carbides, an average area of the eutectic carbides, Rockwell hardness C scale (HRC) by JIS of the corrosion resistance bearing steel, amount of retained austenite in the corrosion resistant bearing steel (volume %), and an average crystal grain size of the corrosion resistant bearing steel for each of the examples 1, 2, and 3.

Figure 2:
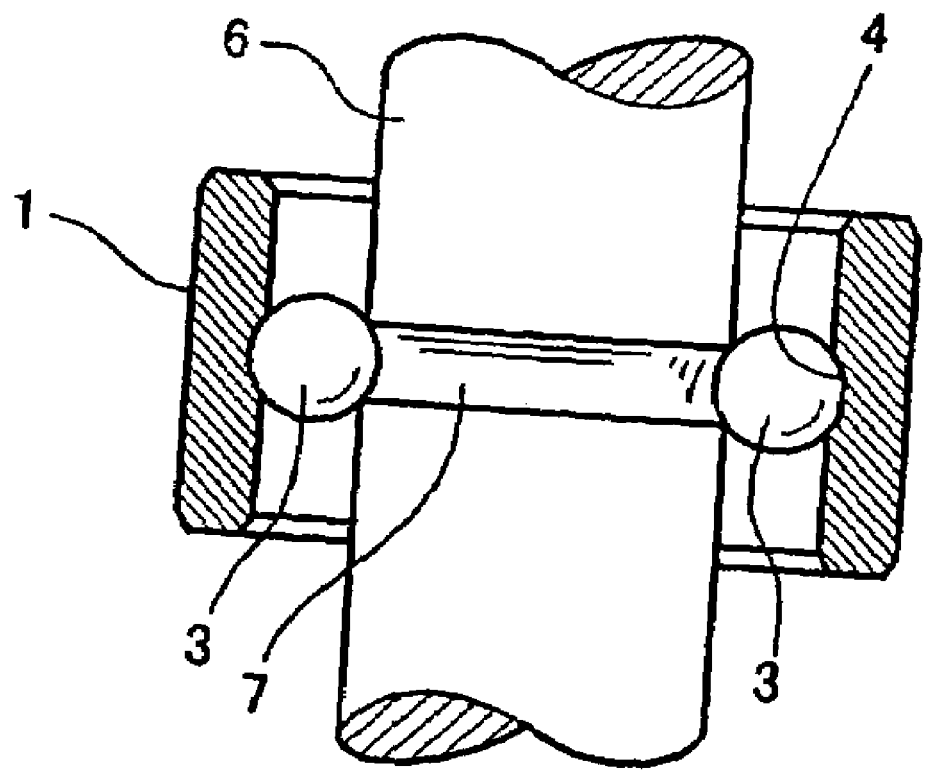
FIG. 2 is a longitudinal sectional view of another embodiment of the rolling bearing of the present invention.

Referring to FIG. 2, a plurality of rolling elements 3 are loaded between a rolling contact groove 7 formed on an outer periphery of a shaft 6 and the rolling contact groove 4 formed on an inner periphery of the outer ring 1 (Example 4). In the example 4, the outer ring 1 and the shaft 6 are formed of the corrosion resistant bearing steel having the composition shown on table 1, and the rolling elements 3 are formed of the high-carbon chromium bearing steel (SUJ2 by JIS). Table 4 also lists an area ratio of eutectic carbides contained in corrosion resistant bearing steel, a maximum diameter of the eutectic carbides, an average value of circle equivalent diameters of the eutectic carbides, an average area of the eutectic carbides, Rockwell hardness C scale (HRC) by JIS of the corrosion resistant bearing steel, amount of retained austenite in the corrosion resistant bearing steel (volume %), and an average crystal grain size of the corrosion resistant bearing steel for the example 4.

While the outer ring 1 and the shaft 6 are both formed of the corrosion resistant bearing steel of the present invention in the example 4, only one of the outer ring 1 and the shaft 6 which requires corrosion resistance and high temperature strength may alternatively be formed of the corrosion resistant bearing steel depending on use conditions. In a further alternative, the outer ring 1, the shaft 6, and the rolling element 3 may be formed of the corrosion resistant bearing steel.

In example 5, the outer ring 1 and the inner ring 2 are formed of corrosion resistant bearing steel of the present invention having a composition (weight %) shown in table 2 below, which is different from that shown in table 1, the rolling element 3 is formed of the high-corrosion chromium bearing steel (SUJ2 by JIS), and an average crystal grain size of the corrosion resistant bearing steel is limited within the range of the present invention.

In example 6, all of the outer ring 1, the inner ring 2, and the rolling elements 3 are formed of the corrosion resistant bearing steel having the composition shown in table 2, and an average crystal grain size of the corrosion resistant bearing steel is limited within the range of the present invention.

Table 4 also lists an area ratio of eutectic carbides contained in the corrosion resistant bearing steel, a maximum diameter of the eutectic carbides, an average value of circle equivalent diameters of the eutectic carbides, an average area of the eutectic carbides, Rockwell hardness C scale (HRC) by JIS of the corrosion resistant bearing steel, amount of retained austenite in the corrosion resistant bearing steel (volume %), and an average crystal size of the corrosion resistant bearing steel for each of the examples 5 and 6.

To obtain the above corrosion resistant bearing steel, after conducting water quenching from a temperature of 1025° C., sub-zero treatment at a temperature of −80° C. was conducted and then the steel was tempered to 170° C.

TABLE 1

(weight percent)

| C | Si | Mn | P | S | Cr | Cu | Mo | V | Ti | O |
|---|---|---|---|---|---|---|---|---|---|---|
| 0.52 | 0.25 | 0.70 | 0.023 | 0.002 | 9.11 | 0.49 | 0.29 | 0.03 | 14 ppm | 15 ppm |

Fe = remaining componennt

TABLE 2

(weight percent)

| C | Si | Mn | P | S | Cr | Cu | Mo | V | Ti | O |
|---|---|---|---|---|---|---|---|---|---|---|
| 0.50 | 0.25 | 0.50 | 0.010 | 0.003 | 8.85 | 0.51 | 0.40 | 0.04 | 13 ppm | 12 ppm |

Fe = remaining componennt

TABLE 3

(weight percent)

| C | Si | Mn | P | S | Cr | Mo | V | Ti | O |
|---|---|---|---|---|---|---|---|---|---|
| 0.68 | 0.85 | 0.64 | 0.021 | 0.016 | 12.20 | 0.17 | 0.11 | 14 ppm | 12 ppm |

Fe = remaining component

TABLE 4

| | Corrosion Resistant Bearing Steel | | | | | | Other Characteristics | | | | |
|---|---|---|---|---|---|---|---|---|---|---|---|
| | Carbides | | | | | | Amount of | Average | Rolling Bearing | | |
| | Area ratio (%) | Maximum Diameter (μm) | Circle Equivalent Diameter Average (μm) | Average Area (μm²) | Hardness (HRC) | Retained Austenite (%) | Crystal Grain Size (μm) | Characteristic Values | | | |
| | | | | | | | | Anderon Value | | Process-ability | Life | Cost |
| | | | | | | | | M | H | | | |
| Example 1 | 2.6 | 13 | 0.2 | 0.03 | 58 | 4 | 8.62 | 2.36 | 1.80 | 109 | 108 | 95 |
| Example 2 | 3.1 | 12 | 0.6 | 0.3 | 60 | 6 | 7.46 | 2.40 | 1.92 | 108 | 108 | 95 |
| Example 3 | 2.4 | 17 | 1.5 | 1.8 | 59 | 4 | 10.2 | 2.60 | 1.98 | 108 | 105 | 95 |
| Example 4 | 4.6 | 15 | 1.1 | 1.0 | 62 | 5 | 11.4 | 2.63 | 1.99 | 106 | 106 | 95 |
| Example 5 | 5.2 | 17 | 0.7 | 0.4 | 62 | 6 | 7.0 | 2.44 | 1.85 | 108 | 108 | 95 |
| Example 6 | 2.8 | 12 | 1.0 | 0.8 | 60 | 4 | 6.7 | 2.45 | 1.90 | 105 | 106 | 95 |
| Contrast 1 | 2.6 | 12 | 1.8 | 2.5 | 60 | 6 | 8.7 | 2.76 | 2.12 | 102 | 103 | 132 |
| Contrast 2 | 2.0 | 8 | 0.2 | 0.1 | 62 | 7 | 11.3 | 2.52 | 1.90 | 104 | 103 | 152 |
| Contrast 3 | 7.3 | 35 | 2.8 | 6.2 | 59 | 7 | 9.5 | 3.47 | 2.94 | 99 | 102 | 94 |
| Prior Art 1 | 2.5 | 15 | 2.7 | 5.7 | 58 | 6 | 9.8 | 2.95 | 2.55 | 100 | 100 | 100 |
| Prior Art 2 | 2.2 | 8 | 2.1 | 3.5 | 60 | 7 | 10.5 | 2.90 | 2.25 | 102 | 102 | 138 |

The area ratio of the eutectic carbides in the corrosion resistant steel, the maximum diameter of the eutectic carbides, the average value of the circle equivalent diameters of the eutectic carbides, and the average area of the eutectic carbides can be controlled according to manufacturing conditions (e.g., refining time, degassing condition, incorporation of a diffusion heat treatment process, etc.) in manufacturing processes including control of impurity elements, preparation of a material, refining, casting etc. However, in order to allow the conventional stainless steel having the composition (weight %) shown in table 3 to contain the eutectic carbides with a maximum diameter of 20 μm or less, manufacturing cost may significantly increase, because of the use of a special material and an increase in the manufacturing processes.

The average crystal grain size of the corrosion resistant bearing steel, the hardness of the corrosion resistant bearing steel, and the amount of retained austenite in the corrosion resistant bearing steel can be controlled based on heating temperature and heating time in quenching, cooling speed, cooling medium, cooling temperature and cooling time, tempering temperature and tempering time, etc.

An evaluation test of vibration and noise regarding the rolling bearings of the examples 1 to 6 was conducted according to AFBMA (The Anti-Friction Bearing Manufactures Association, Inc.) standard. Table 4 also lists indices representing results (anderon values) of the evaluation test of vibration and noise, indices indication of processability (machinability), life, and cost of the rolling bearings of the examples 1 to 6.

Table 4 also lists results of evaluation of the contrasts 1 to 3 and the prior arts 1 and 2. The stainless steel used for these have the conventional composition which is shown in table 3 and is significantly different from those of the corrosion resistant bearing steel of the present invention shown in tables 1 and 2. In the contrasts 1 to 3, the rolling elements 3 are formed of high-carbon chromium bearing steel (SUJ2 by JIS), the outer ring 1 and the inner ring 2 are formed of the stainless steel having the composition shown in table 3, and at least one of characteristic values of the area ratio of the eutectic carbides contained in the stainless steel, the average value of the circle equivalent diameters of the eutectic carbides, the average area of the eutectic carbides, and the amount of retained austenite in the steel (volume %), is outside of the range of the present invention.

In the prior arts 1 and 2, the outer and inner rings 1 and 2, and the rolling element 3 are formed of the stainless steel having the composition shown in table 3, and at least one of characteristic values including the average value of the circle equivalent diameters of the eutectic carbides contained in the stainless steel, the average area of the eutectic carbides, and the amount of retained austenite in the stainless steel (volume %), is outside of the range of the present invention.

In table 4, M and H of the anderon value represent a medium frequency band (300 to 1800 Hz) and a high frequency band (1800 to 10000 Hz) of measurement frequency bands, respectively. In an equal frequency band, lower anderon values represent better noiselessness.

The processability, the life, and the cost of the rolling bearing are represented by indices assuming that those of the prior art 1 are 100. Regarding the processability and the life, larger values indicate better processability and longer life. Regarding the cost, smaller values indicate lower cost. The processability was evaluated in such a manner that peripheral cutting and parting cutting were conducted by precision lathe and the resulting current increases were measured and compared. The life was evaluated in such a manner that, after heating the rolling bearing at temperatures such as 20° C., 80° C., and 100° C. for a predetermined time based on specification determined according to the use, and rotating the rolling bearing for about 1000 hours in total, the rotation condition (e.g., sound or vibration), grease condition, etc were compared.

Table 4 shows the followings:

(1) Since the area ratio of the carbides, the maximum diameter of the carbides, the average value of the circle diameter diameters of the carbides, and the average area of the carbides of the contrast 2 are the smallest, the corresponding anderon value is small. However, since the contrast 2 using the conventional stainless steel for the outer and inner rings 1 and 2 requires special manufacturing processes to reduce these values, the manufacturing cost significantly increases. That is, the material of the contrast 2 is not economical.

(2) In the contrast 1 and the prior arts 1 and 2, the maximum diameters of the carbides are substantially equal to or shorter than those of the examples 1 to 6, but the average value of the circle equivalent diameters of the carbides and the average area of the carbides are outside the ranges of the present invention, and the anderon values are larger than those of the examples 1 to 6. In addition, in the contrast 1 and the prior arts 1 and 2, the costs are higher than those of the examples 1 to 6 to reduce the maximum diameters of the carbides. In particular, since the maximum diameters of the carbides of the prior art 2 and the contrast 1 are as small as 8 μm and 12 μm, respectively, and the average values of the circle equivalent diameters of the carbides of the prior art 2 and the contrast 1 are relatively small, the manufacturing costs are extremely high.

(3) In the contrast 3, since the area ratio of the carbides, the average value of the circle equivalent diameters of the carbides, the average area of the carbides, and the amount of retained austenite are outside of the ranges of the present invention, the anderon values are extremely large.

(4) In comparison with the above contrasts and prior arts, the area ratio of the carbides, the average value of the circle equivalent diameters of the carbides, and the average area of the carbides in the examples 1 to 6 are all within proper ranges of the present invention. In addition, since other characteristics including the hardness of the corrosion resistant bearing steel, the amount of retained austenite (volume %) in the corrosion resistant bearing steel, and the average crystal grain size of the corrosion resistant bearing steel in the examples 1 to 6, are within proper ranges of the present invention, the corresponding anderon values are substantially equal to that of the contrast 2, and the processability, the life and the cost are all better than those of the prior arts.

Figure 3:
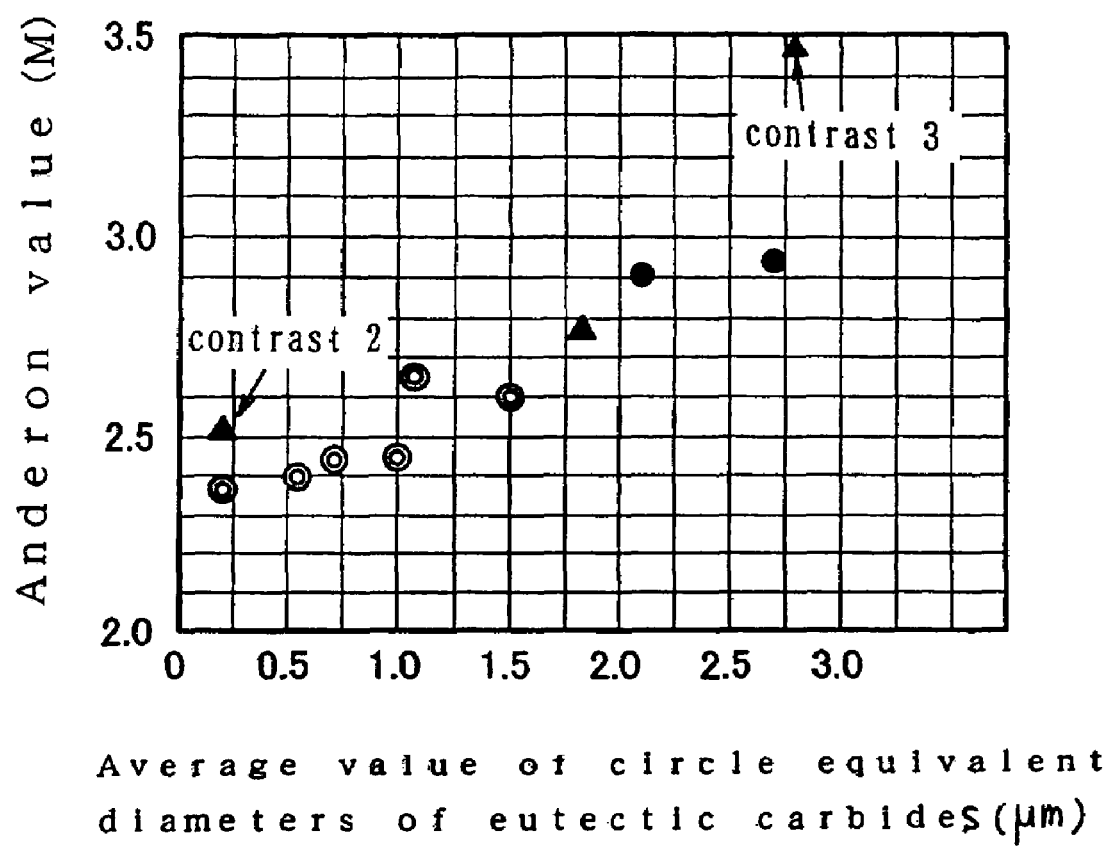
FIG. 3 is a view showing the relationship between an average value (μm) of circle equivalent diameters of eutectic carbides and anderon value (M)
Figure 4:
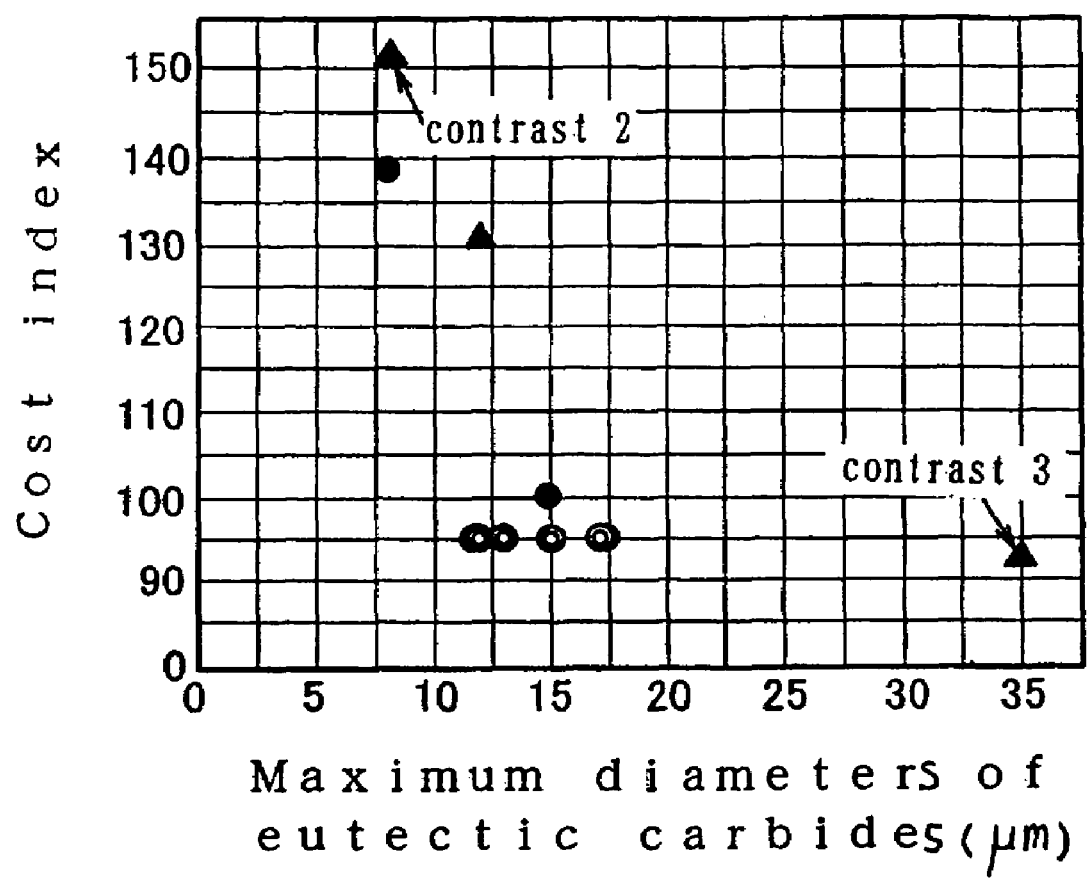
FIG. 4 is a view showing the relationship between a maximum diameter (μm) of the eutectic carbides and cost index.

FIG. 3 shows the relationship between the average values of the circle equivalent diameters and the anderon values (M). FIG. 4 shows the relationship between the maximum diameter and the cost index. In FIGS. 3 and 4, "◎" represent examples of the present invention, "▲" represent contrasts, and "●" represent prior arts. In FIGS. 3 and 4, the feature of the present invention is clearly shown, in which the anderon values and the costs are low.

As shown in FIG. 4, the cost of the contrast 3 is the lowest, but as shown in FIG. 3, the anderon value of the contrast 3 is extremely high. As shown in FIG. 3, the anderon value of contrast 2 is low, but as shown in FIG. 4, the cost of the contrast 2 is extremely high.

The area ratio of the carbides, the maximum diameter of the carbides, the average value of the circle equivalent diameters of the carbides, the average area of the carbides, and the average crystal grain size of the carbides, which are shown in table 2, were measured in such a manner that samples of the corrosion resistant bearing steels (or stainless steel) were buried in resin and ground, and the resulting samples were observed by metallic microscope and photographed at 400 magnification, and the images were measured by the image analysis device.

Figure 5:
FIG. 5 is a view showing an scanning electron microscope (SEM) image of a carbide deposited on corrosion resistant bearing steel or stainless steel.

The eutectic carbide with the maximum diameter is least expected to appear on the ground surface. So, the rolling bearing was dissolved by galvanostatic electrolysis in an acid solution, the carbides were filtered by a filter, and the texture of the corrosion resistant bearing steel was observed at 2000 magnification by scanning electron microscope (SEM). The results are shown in FIG. 5. In FIG. 5, white mass portions represent the carbides.

The volume (%) of retained austenite in the corrosion resistant bearing steel (or stainless steel) was measured by a surface X-ray diffraction spectroscopy after samples were treated by a electroextraction process. The analysis conditions were such that the target was Cu, the acceleration voltage was 40 kV, and the sample current was 180 mA. The scanning range was 41.2 to 46. 705 degrees. The analysis method was such that a crystal structure was identified by integrated intensities of diffraction lines of Miller indices h, k, and 1, and a relative volume ratio of the amount of retained austenite in the corrosion resistant bearing steel was decided.

As a X-ray diffraction device, RINT1500/2000 type manufactured by Rigaku Denki Corporation was used.

Figure 6:
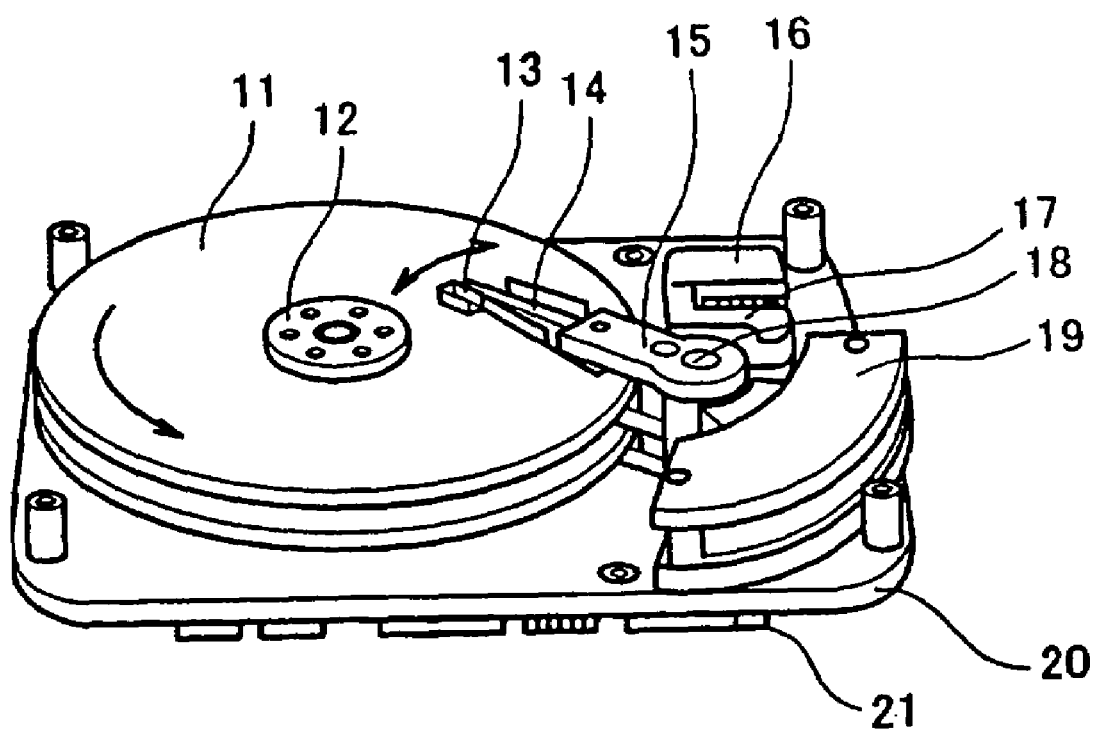
FIG. 6 is a perspective view of an external appearance of a hard disk drive.

FIG. 6 is a perspective view showing an external appearance of a hard disk drive illustrating an example of an instrument including a rotating portion to which the rolling bearing of the present invention can be applied. In FIG. 6, reference numeral 11 denotes a disk, 12 denotes a spindle motor, 13 denotes a head, 14 denotes a suspension, 15 denotes a swing arm, 16 denotes a preamplifier, 17 denotes a flexer, 18 denotes a swing arm bearing, 19 denotes a voice coil motor, 20 denotes a frame, and 21 denotes an electric circuit.

The hard disk drive can be used in precision instruments such as videotape recorder, or computer peripheral device. In addition, the rolling bearing of the present invention can be used in a rotating portion such as a spindle motor or fan motor.

INDUSTRIAL APPLICABILITY

Since the present invention is constituted as described above, the present invention is especially suitable for use as a rolling bearing suitable for use in a rotating portion of precision instrument such as videotape recorder or computer peripheral device, a material for the rolling bearing, and the instrument including the rotating portion using the rolling bearing.

The invention claimed is:

1. A rolling bearing sized for use in a swing arm of a hard disk drive, the rolling bearing comprising a plurality of rolling elements provided between inner and outer rings, at least one of the inner and outer rings being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%, the corrosion resistant bearing steel having a hardness of HRC 58 to 62 by JIS, and containing a retained austenite of 6 volume % or less.

2. A rolling bearing sized for use in a swing arm of a hard disk drive the rolling bearing comprising a plurality of rolling elements provided between inner and outer rings, the inner and outer rings, and the rolling elements being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%, the corrosion resistant bearing steel having a hardness of HRC 58 to 62 by JIS, and containing a retained austenite of 6 volume % or less.

3. A rolling bearing sized for use in a swing arm of a hard disk drive, the rolling bearing comprising a plurality of rolling elements provided between a rolling contact groove formed on an outer periphery of a shaft and a rolling contact groove formed on an inner periphery of an outer ring, at least one of the shaft and the outer ring being formed of corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%, the corrosion resistant bearing steel having a hardness of HRC 58 to 62 by JIS, and containing a retained austenite of 6 volume % or less.

4. The rolling bearing according to claim 1, wherein an average crystal grain size of the corrosion resistant bearing steel is 6 to 9.5 μm.

5. A material for a rolling bearing, which is corrosion resistant bearing steel comprising carbon of 0.5 to 0.56 wt %, silicon of 1 wt % or less, manganese of 1 wt % or less, phosphorus of 0.03 wt % or less, sulfur of 0.01 wt % or less, chromium of 8.00 to 9.50 wt %, molybdenum of 0.15 to 0.50 wt %, copper of 0.30 to 0.7 wt %, titanium of 15 ppm or less, vanadium of 0.15 wt % or less, oxygen of 15 ppm or less, iron as remaining component and impurities inevitably incorporated thereinto, the corrosion resistant bearing steel containing eutectic carbides having a circle equivalent diameter with an average value of 0.2 to 1.6 μm, the eutectic carbides having an average area of 0.03 to 2 μm$^2$ and an area ratio of 2 to 7%.

6. An instrument having a rotating portion using the rolling bearing according to claim 1.

7. An instrument having a rotating portion using the rolling bearing according to chain 2.

8. An instrument having a rotating portion using the rolling bearing according to claim 3.

9. An instrument having the rotating portion according to claim 6 wherein the instrument is a hard disk drive.

10. An instrument having the rotating portion according to claim 6 wherein the instrument is a precision instrument.

11. The rolling bearing according to claim 2, wherein an average crystal grain size of the corrosion resistant bearing steel is 6 to 9.5 μm.

12. The rolling bearing according to claim 3, wherein an average crystal grain size of the corrosion resistant bearing steel is 6 to 9.5 μm.

13. An instrument having a rotating portion using the rolling bearing according to claim 4.

14. An instrument having the rotating portion according to claim 7 wherein the instrument is a hard disk drive.

15. An instrument having the rotating portion according to claim 13 wherein the instrument is a hard disk drive.

16. An instrument having the rotating portion according to claim 8 wherein the instrument is a hard disk drive.

17. An instrument having the rotating portion according to claim 7, wherein the instrument is a precision instrument.

18. An instrument having the rotating portion according to claim 8, wherein the instrument is a precision instrument.

19. An instrument having the rotating portion according to claim 13, wherein the instrument is a precision instrument.

20. The rolling bearing of claim 1 in combination with a hard disk drive, the hard disk drive having a rotating portion, the rolling bearing operatively coupled to the rotating portion.

21. The rolling bearing of claim 2 in combination with a hard disk drive, the hard disk drive having a rotating portion, the rolling bearing operatively coupled to the rotating portion.

22. The rolling bearing of claim 3 in combination with a hard disk drive, the hard disk drive having a rotating portion, the rolling bearing operatively coupled to the rotating portion.

* * * * *

UNITED STATES PATENT AND TRADEMARK OFFICE
CERTIFICATE OF CORRECTION

PATENT NO. : 7,396,422 B2  
APPLICATION NO. : 10/531518  
DATED : July 8, 2008  
INVENTOR(S) : Toshiaki Miyauchi Page 1 of 1

It is certified that error appears in the above-identified patent and that said Letters Patent is hereby corrected as shown below:

On the Cover Page:

Item (57), line 7, "rings and is" should be -- rings is --.

Signed and Sealed this

Twenty-ninth Day of September, 2009

David J. Kappos  
*Director of the United States Patent and Trademark Office*